Sept. 20, 1966  B. L. BOWER  3,273,834
AIR DROP AUTOROTATING GYROPLANE DROP CHUTES
Filed April 4, 1961  2 Sheets-Sheet 1
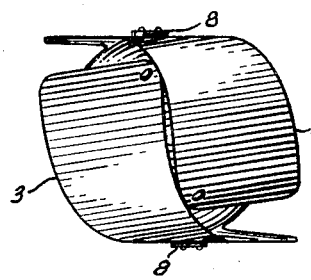
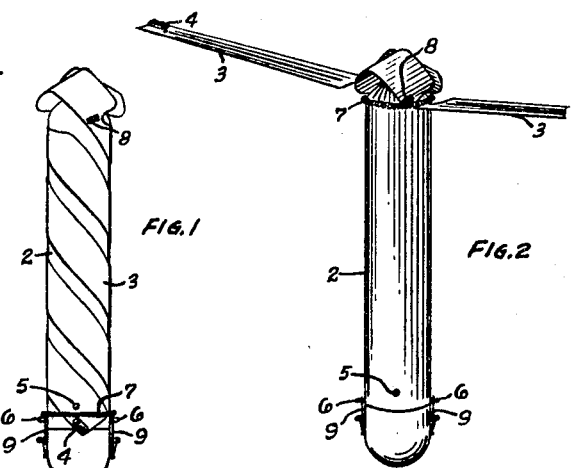
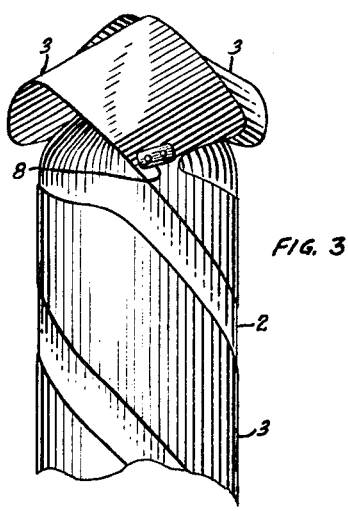
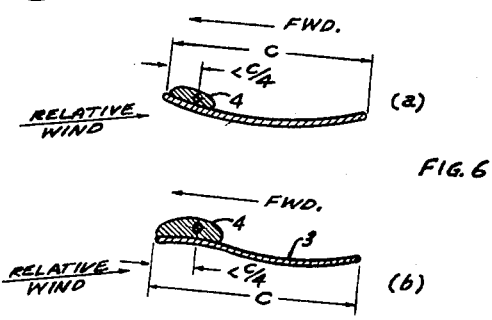
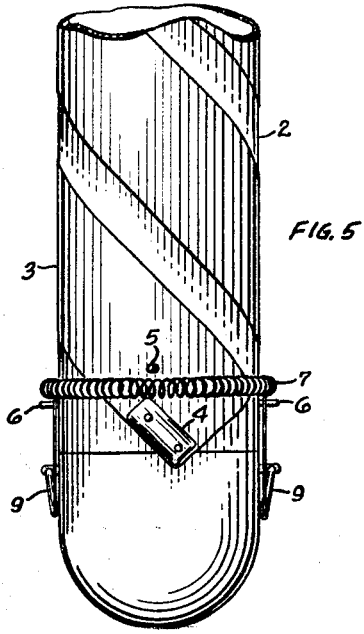
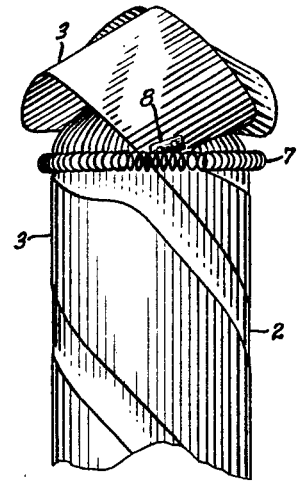
INVENTOR
Bernal L. Bower Sept. 20, 1966 B. L. BOWER 3,273,834
AIR DROP AUTOROTATING GYROPLANE DROP CHUTES
Filed April 4, 1961 2 Sheets-Sheet 2
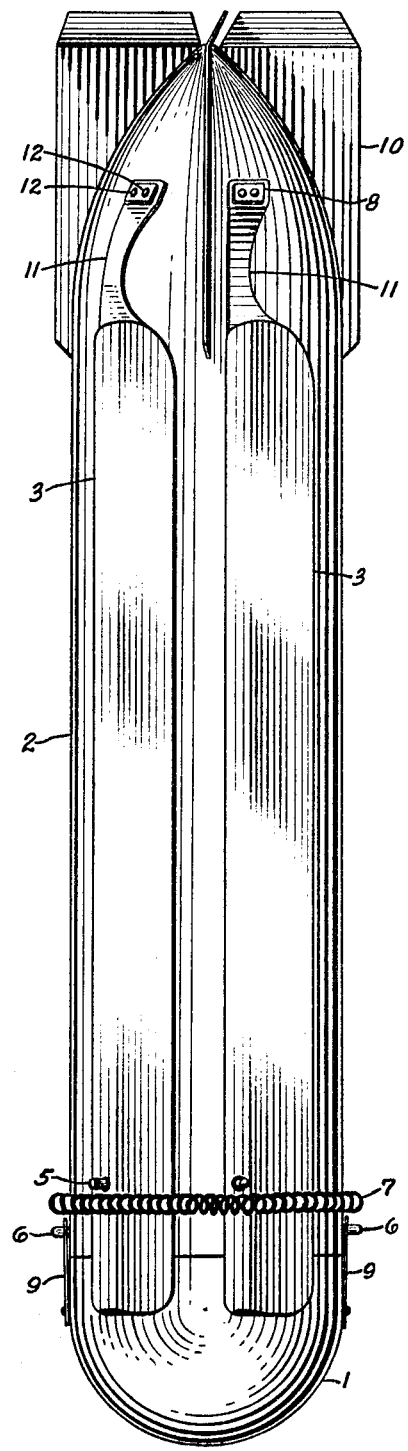
FIG. 9
FIG. 8
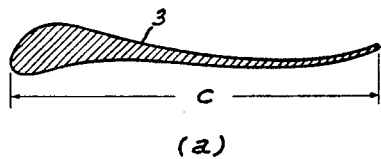
(a)
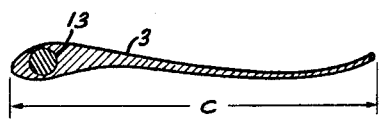
(b)
INVENTOR
Bernal L. Bower United States Patent Office 3,273,834
Patented Sept. 20, 1966

3,273,834
AIR DROP AUTOROTATING GYROPLANE DROP CHUTES
Bernal L. Bower, 8336 Creighton Ave., Los Angeles, Calif.
Filed Apr. 4, 1961, Ser. No. 131,945
18 Claims. (Cl. 244—138)

My invention relates to improvements in airdrop autorotating gyroplane drop chutes and has for its purpose the design and manufacture of a device useful for airdropping cargo or other load from aircraft; a device which may be more easily manufactured and therefore costs less to produce, and yet be as effective in decelerating and landing its load as those types commonly manufactured for this purpose. The objects of my improvements are first, to provide flexible, aerodynamically stable autorotating vanes or blades; second, to provide a cargo container of cylindrical shape about which the vanes or blades may be wrapped when stowed; third, to provide means for retaining the blades in the stowed position until rate of descent of the drop chute has been reduced to below some determined maximum rate and until rotation of the drop chute has exceeded some determined rate; fourth, to provide means for aligning the axis of the drop chute with the free stream and by which means will be produced torque necessary to accelerate the drag chute rotationally to a rotational speed nearly that of its operational rotating speed; fifth, to provide means for releasing the blades symmetrically and at such an angle of attack relative to the free stream flow that a minimum of aerodynamic twisting occurs as a result of the blades attempting to seek an aerodynamic balance; sixth, to provide means for releasing the blades at the proper drop chute rotational speed and to maintain the blades (though highly flexible) in a taut rotating system at the proper rotating cone angle.

I attain these objects by the mechanical device illustrated in the accompanying drawing in which FIGURE 1 is an elevation showing the drop chute with blades stowed or wrapped around the cylindrical cargo container; FIGURE 2 is an elevation showing the drop chute with the blades extended and in na attitude they might assume while autorotating at design operating rotational speed; FIGURE 3 and FIGURE 4 are detailed views showing the manner in which the blades are attached to the head of the cargo cylinder to form the aligning and rotating finned head; FIGURE 5 is a detailed view showing the manner in which the blades are retained in the stowed position, the retaining spring, the weights at the blade tips and the spring retaining pins; FIGURE 6 is a section through one of the blades showing the two possible airfoil sections for use as a flexible autorotating vane or blade, and showing the approximate location of the tip weight for each section.

FIGURE 7 is a detailed view showing the position assumed by the O-spring when the blades are in the flight position. FIGURE 8 illustrates the blade section shape and manner of construction for blades made from a reinforced plastic material. FIGURE 9 is a side view showing a second embodiment of the autorotating air drop chute device.

The cone ended cylinder 2, and its removable nose 1, constitute the cargo container. In this container-body, the cargo to be airdropped may be placed. The hemisphere ended lid which forms the nose 1 of the cargo container may be snap-fastened to the container-body 2, as shown, or it may be fastened in some other way such as by screwing the nose into mating threads in the container-body against a pressure tight gasket, such sealing is desirable, as it might be if the cargo is to be airdropped into the ocean or other body of water. The threads could be formed easily and inexpensively by compression molding the container-body and nose, using some reinforced thermosetting plastic. The thin flexible blades 3, 3 are wrapped around the cylindrical cargo container-body in a helical manner. The blades are wrapped in this manner when stowed for several reasons: first, the blades lie flat against the cargo container thus forming the most compact package possible; second, it is possible to stow a blade which is longer than the cargo container when stowed this way; third, when the blades are released and unwrap, they bend most readily about an axis which is normal to the blade leading edge (i.e., along a blade chord) which bending progresses inboard finally to the point of blade fastening. Since during the period of time while the blades are unwrapping, the free stream velocity along the body axis is high compared to the rotational tip speed and since the blades are designed to balance at some small angle of attack, it is desirable that the blades not be caused to twist severely in order to achieve this balance. The blade relative wind may be at angles less than 45° to the body axis during load deceleration and unwrapping of the blades. Even at operating rotational speeds the relative wind of the inboard blade sections may be at angles less than 45° to the body axis. If the blades are wrapped at a helix angle of about 45°, the blades as they bend and unwrap from the body will assume naturally an angle of about 45° close to the bending axis at the body. The outboard sections may assume smaller negative angles relative to the horizontal, i.e. the normal to the axis of rotation, as the unwrapping progresses and the blade twists slightly throughout its length. When the blades have completely unwrapped and the rotation comes up to operating speed, the blade tip sections may assume small positive angles relative to the normal to the axis of rotation, i.e., relative to the horizontal if the axis of the rotation is vertically.

The blade tip weights 4, 4 are fastened to the blade ends at the approximate locations shown in FIGURES 1, 5 and 6. For aerodynamic stability, the center of gravity of the weights must be forward of the blade quarter chord. The negative blade camber, FIGURE 6(a), and the reflexed trailing edge of the section shown in FIGURE 6(b), result in a zero-lift positive or clockwise twisting moment about the blade quarter chord. By attaching the weight so that its center of gravity is forward of the blade quarter chord, i.e., forward of the blade aerodynamic center, balance is achieved at some positive angle of attack and at its related blade lift coefficient. The weight center of gravity position at the tip and the blade attachment position at the root defines the load line position along the span and thus the loading of the blade. Since the blade is loaded forward of its aerodynamic center, the negative pitching moment afforded by the load balances the positive pitching moment about the aerodynamic center due to the negative camber or reflexed trailing edge. It is well known in the art that negatively cambered or reflexed airfoils are aerodynamically stable if loaded forward of the aerodynamic center or forward of approximately the quarter chord. The position of the weight center of gravity determines the lift coefficient $C_L$ at which aerodynamic balance is achieved, and thus the operating blade angle of attack, and blade loading.

The reflexed blade section is preferred to the one with negative camber because higher operating lift coefficients may thereby be attained without blade stalling. The blade weights may be attached by rivets or screws to a metal blade as shown, or molded into a reinforced plastic blade if desired.

The blades when wrapped about the container-body as shown in FIGURES 1 and 5 are retained in place by mating the blade indexing hole with retaining pin 5 and placing the O spring 7 over the blade. The O spring 7 is retained from rolling up the body by retaining pins 5, 5 which protrude sufficiently beyond the spring axis to effectively retain the spring. The O spring 7 is retained from rolling down the body and off the blades by both the detent afforded by the blade weight and also the pins 6, 6. Pins 6, 6 protrude beyond the axis of spring 7 somewhat and serve as the attach point for the nose 1. The nose attach fasteners 9, 9 may be thin formed leaf springs which deflect to pass over pins 6, 6 and snap into place as their mating holes come into alignment with pins 6, 6. Any practicable means may be employed for attaching the nose section to the container-body, and if pins 6, 6 are not used for this purpose, blade weights 4, 4 and pins 5, 5 may serve to retain spring 7 alone.

The blade weights 4, 4 may be selected such that the vertical component of force along the blade axis at the root produced by them at the design operating speed of rotation is sufficient to balance the gross weight of the drop chute at the desired blade cone angle. Any practicable number of blades may be employed for use in this device. The load to be dropped, blade loading, and other aerodynamic parameters may be analytically combined to render the most economical basic dimensions and number of blades for use in a particular application.

The blade inboard, or root, attachment to the container-body is shown in detail in FIGURE 7. A small rectangular bearing plate 8 with rounded lower edge to prevent tearing the thin blades may be employed, affixed with rivet or screw fasteners. The angle which the lower edge of the bearing plate makes with the axis of the container-body should be somewhat greater than 45°. The blades are cut out along the trailing edge in the manner shown in FIGURE 7 in order to provide relief for O spring 7 which positions itself against the bearing plate 8, as shown in FIGURE 7 when the blades are in the flight position, shown in FIGURE 2.

The method of folding and fastening the blade extentions inboard of the root fastening point is shown in FIGURE 3, and FIGURE 4. The portions of the blades extending inboard beyond bearing plate 8 are bent through approximately 140 degrees on a radius of about ⅓ of the body cylinder diameter. Their length beyond bearing plate 8 is such that they may be attached to the conical end of the body cylinder on a radian approximately 180 degrees around the body, and approximately half way between the apex and the base of the cone, leaving suitable space between the blade extensions and the cone through which air deflected by the portion of the blade extensions extending beyond the diameter of the body cylinder may flow. The air flowing between the blades and the cone will be deflected through the space to one side of the cone by one blade and through the space at the opposite side of the cone by the other blade. This deflection of the air stream against the blade produces a force couple which tends to rotate the drop chute. This provides a simple and inexpensive but effective means for producing aerodynamic drag aft of the drop chute center of gravity in order to prevent continued tumbling and to stabilize the drop chute with its body axis in line with the free stream and to further decelerate the chute. This method of folding and attaching the blade inboard ends also provides means for initially rotating the chute by producing aerodynamic reactions which cause a force couple about the chute body axis. This force couple accelerates the chute rotationally until the rotational speed is reached at which the centrifugal force of the weights 4, 4 acting against the tension in O spring 7 snaps the spring free of pins 5, 5 and releases the blades 2, 2. It should be recognized that any suitable means such as fins 10, FIGURE 9, set at an angle to the body axis would also serve to stabilize and cause initial rotation of the drop chute and might be used in place of the folded blades; however, the folded blades are preferred because they offer more aerodynamic drag than offset fins and thus serve better to reduce the speed of translation of the drop chute. The folded blade ends are less expensive to manufacture than the fins and thus effect greater economy of production costs.

The use of negative or reflexed blade section camber also makes possible the use of rigid blades flexibly mounted to the cargo container-body or other suitable structure as for example, rigid or semirigid blades made of reinforced thermosetting plastic material molded so as to give the blades reflexed or negative section camber having a thin, highly flexible metal leaf 11 or metal foil of high tensile strength such as spring steel moulded into the end of the blade by which the blade is attached to the cargo container-body or other structure, forming a flexible blade mounting for flexibility both in bending and in twisting so that the blades may easily be folded against the side of the cargo container when stowed, and when released may adjust properly both to the design angle of attack with respect to the relative wind, and to the blade rotating cone angle. Since thin reinforced thermosetting resin sections may now be moulded having high strength and flexibility, production cost savings could be effected by simply narrowing and/or thinning down the section of the blade near the root and reducing the reflexed or negative camber sections to a straight thin section in this area, and attaching the blade to the body with fasteners 12, 12 through this thin narrow flexible section of the blade.

If flexibily attached rigid blades are used instead of flexible blades, the blades may be mounted so as to lay along the cargo container-body and be contiguous with it when in the stowed position shown in FIGURE 9. A retaining O spring similar to spring 7 may be used to retain the blades against the container-body with pins similar pins 5, 5 and 6, 6 shown in FIGURE 5 serving to retain the spring as set forth in this specification for the use with flexible blades. If rigid blades are used in the system instead of flexible blades the blade tip weights will then have to be larger because of the increased blade weight. The weights must be such that the center of gravity of the rotating mass of the blade and weight will be forward of the blade aerodynamic center. If the blade 3 is thickened in the forward quarter as shown in section in FIGURE 8(a) such that its center of gravity is forward of the aerodynamic center probably no blade tip weight will be necessary if the blade weight is sufficient to give the desired rotating cone angle at operating speed. If the blades are made of molded reinforced plastic material, a steel rod 13 or rod of heavier metal may be molded into the nose of the blade as shown in FIGURE 8(b) if necessary to obtain a blade of sufficient weight having its center of gravity ahead of the aerodynamic center.

It is obvious that blades having some degree of resiliency may be substituted in my device for blades which may be so flexible as to not even support their own weight. The only actual requirement for flexibility is that the blade be susceptible to flexure under air loads acting upon it in operational flight. On the other hand, the blade should not be so flimsy or frail that it would be damaged by air loads or inertial loads acting upon it in operational flight. It follows that blades which might be defined as semiflexible or resilient may also have application in my device if such blade fell within the above limits of flexibility.

My invention is not restricted to the embodiments shown and described above. Its scope of application obviously may include anything that is to be airdropped, that is, returned to the earth through the atmosphere for safe landing, or dropped through the atmosphere of another planet, for example, for safe landing thereon. Also, the number of blades to be employed in my device may be any other than that shown in the drawings.

I am aware that prior to my invention airdrop autorotating cargo chutes have been manufactured and successfully used to airdrop cargo from aircraft. These airdrop cargo chutes have been of the rigid or semirigid hinged blade type employing symmetrical airfoils or positive cambered airfoils as blades. I therefore do not claim the generic invention of the autorotating drop chute; but since it is a well known aerodynamic principle that airfoils of positive camber are unstable, and symmetrical airfoils at best are neutrally stable, it being therefore impossible to devise an autorotating airdrop chute employing either rigid blades flexibly mounted or non-rigid, flexible blades of symmetrical or positive airfoil section camber, I broadly claim:

1. In an autorotating airdrop cargo chute, the combination of blades adapted for in-flight flexibility, said blades having negative blade section camber with means comprising an elastic retaining member and retaining pins for retaining said blades in a folded or stowed position until sufficient chute rotational speed has been attained for effective release of said blades, and with means comprising a finned rotor head for initially rotating and establishing said chute rotational speed at which speed said blades may be effectively released, said retaining means subsequently and automatically releasing said blades into the flight position.

2. In an autorotating airdrop chute having semi-flexible or resilient blades adapted to be folded or stowed, the combination of means for stabilizing, decelerating and rotating said airdrop chute prior to release of said blades with means for retaining said blades in a folded or stowed position until such stability, desired speed of translation, and minimum desired speed of rotation have been attained, said retaining means releasing said blades when said boundary conditions of stability, speed of translation, and speed of rotation have been attained.

3. In an autorotating airdrop cargo chute, the combination of blades adapted for in-flight flexibility, said blades having reflexed blade section camber with means comprising an elastic retaining member and retaining pins for retaining said blades in a folded or stowed position until sufficient chute rotational speed has been attained for effective release of said blades, and with means comprising a finned rotor head for initially rotating and establishing said chute rotational speed at which speed said blades may be effectively released, said retaining means subsequently and automatically releasing said blades into the flight position.

4. In an autorotating airdrop chute a flexible blade, said blade comprising a single structural member and a balance weight, a cargo container comprising a taper ended cylindrical body and nose section, said nose section suitably connected to said body to serve as a cargo access door, means comprising a portion of said blade, a bearing plate, and fastener for attaching said blade to said body, said blade adapted to be wrapped around said body into a stowed position, means comprising a finned rotor head adapted to react aerodynamically with the free airstream thereby producing axial drag and axial torque to decelerate, stabilize and to rotate the airdrop chute prior to release of the blade from said stowed position, an elastic retaining member and retaining pin, said retaining pin mating with a corresponding hole in the blade, said elastic retaining member overlying the blade between the retaining pin and the blade balance weight thereby retaining the blade in the stowed position, said elastic retaining member having such an elastic characteristic and shape that at a predetermined spin rate of chute rotation said elastic retaining member releases said blade from the stowed position into the flight position.

5. In an autorotating airdrop cargo chute, the combination of a blade flexible in flight, a cargo container with means comprising a portion of said blade for mounting said blade thereto, said blade adapted to be retained in a stowed position, means comprising an elastic retaining member and retaining pin for retaining said blade therein, means comprising a finned rotor head for stabilizing, decelerating, and rotating said airdrop chute, said blade retaining means retaining said blade in the stowed position until such stability, translational, and rotational speed for effective release of said blade have been attained, said blade retaining means automatically releasing said blade when said desired chute stability, translational, and rotational speed have been attained.

6. In an autorotating airdrop chute a blade, a container, said blade adapted to be stowed contiguous with said container, means for retaining said blade in said stowed position, means comprising a finned rotor head for aerodynamically stabilizing, decelerating and rotating said airdrop chute, said blade retaining means retaining said blade in the stowed position until sufficient chute rotational speed, desired translational speed, and stability have been attained for effective release of said blade, said blade retaining means subsequently and automatically releasing said blade into the flight position.

7. In an autorotating airdrop chute a blade adapted for in-flight flexibility, said blade adapted to be retained in a stowed position, means for retaining said blade therein, means for rotating said airdrop chute prior to release of said blade from the stowed position, said retaining means subsequently releasing said blade from the stowed position into the flight position.

8. In an autorotating airdrop chute a blade, said blade adapted to be retained in a folded or stowed configuration, means for retaining said blade therein, means for rotating said airdrop chute prior to release of said blade from the folded or stowed configuration, said blade retaining means subsequently releasing said blade from said stowed configuration to the operating flight position.

9. In an autorotating airdrop chute a flexible blade, a finned rotor head comprising an inboard extension of said blade suitably formed to react aerodynamically with the free airstream to provide axial drag and axial torque in required proportion whereby said airdrop chute is aerodynamically balanced, stabilized, decelerated, and rotated during a period of free fall when said blade in inoperative in controlling the descent of said airdrop chute.

10. The combination in an autorotating airdrop chute of a flexible blade, a blade tip balance weight, a container with said blade fastened rigidly thereto, said blade having negative blade section camber.

11. In an autorotating airdrop chute the combination of a flexible blade, a blade tip balance weight, a container with said blade fastened rigidly thereto, said blade having reflexed blade section camber.

12. Autorotating airdrop chute as claimed in claim 8 in which said blade is essentially rigid.

13. Autorotating airdrop chute as claimed in claim 7 in which said blade is made of an essentially rigid or semi-resilient material having appreciable thickness throughout the greater portion of its span, but made thin and flexible at the root.

14. Autorotating airdrop chute as claimed in claim 8 in which said blade is essentially rigid, and said means for rotating said airdrop chute also stabilizes and decelerates said airdrop chute prior to release of said blade.

15. Autorotating airdrop chute as claimed in claim 8 in which said blade is essentially rigid, said rotating means comprising a finned rotor head.

16. Autorotating airdrop chute as claimed in claim 8 in which said blade is essentially rigid, a container with means for mounting said rigid blade flexibly thereto.

17. Autorotating airdrop chute as claimed in claim 6 in which said blade is essentially rigid, with means for mounting said rigid blade flexibly to said container.

18. Autorotating airdrop chute as claimed in claim 8 in which said blade is essentially rigid, a container with means for mounting said rigid blade flexibly thereto, said rotating means comprising a finned rotor head.

References Cited by the Examiner

UNITED STATES PATENTS

| | | | |
|---|---|---|---|
| 2,135,700 | 11/1938 | Cierva | 170—160.56 |
| 2,575,533 | 11/1951 | Seibel | 170—160.53 |
| 2,614,636 | 10/1952 | Prewitt | 244—138 |
| 2,889,887 | 6/1959 | Stanley | 170—159 |
| 2,918,235 | 12/1959 | Aberg et al. | 244—138 |

FOREIGN PATENTS

| | | |
|---|---|---|
| 62,963 | 4/1949 | Netherlands. |
| 1,032,647 | 4/1953 | France. |
| 1,187,872 | 3/1959 | France. |

OTHER REFERENCES

Aviation Week Magazine, June 14, 1948, pages 23 and 24.

Principles of Aerodynamics by James H. Dwinnell, pages 118–120, McGraw-Hill Book Co., Inc., New York 1949.

MILTON BUCHLER, *Primary Examiner.*

FERGUS S. MIDDLETON, *Examiner.*

W. E. BURNS, A. E. CORRIGAN, *Assistant Examiners.*